United States Patent [19]
Rose et al.

[11] Patent Number: 6,090,010
[45] Date of Patent: Jul. 18, 2000

[54] SYSTEM FOR ADAPTING THE BRAKING MOMENT OF A PRIMARY SYSTEM AS A FUNCTION OF THE GEAR SPEED SETTING

[75] Inventors: Peter Rose, Heidenheim; Peter Heilinger, Crailsheim; Gunter Schoof, Satteldorf; Roland Scherer, Crailsheim, all of Germany

[73] Assignee: Voith Turbo GmbH & Co. K.G., Germany

[21] Appl. No.: 09/284,517

[22] PCT Filed: Oct. 17, 1997

[86] PCT No.: PCT/EP97/05726

§ 371 Date: Jun. 28, 1999

§ 102(e) Date: Jun. 28, 1999

[87] PCT Pub. No.: WO98/17518

PCT Pub. Date: Apr. 30, 1998

[30] Foreign Application Priority Data

Oct. 18, 1996 [DE] Germany .......................... 196 43 079

[51] Int. Cl.[7] .................................................. B60T 10/00
[52] U.S. Cl. .................................................. 477/92
[58] Field of Search ........................... 477/71, 92

[56] References Cited

U.S. PATENT DOCUMENTS

| | | | |
|---|---|---|---|
| 4,373,619 | 2/1983 | Schritt et al. | 477/71 |
| 5,357,444 | 10/1994 | Ishiguro et al. | 364/426.01 |
| 5,655,407 | 8/1997 | Dresdon, III et al. | 477/92 |
| 5,830,105 | 11/1998 | Iizuka | 477/92 |

FOREIGN PATENT DOCUMENTS

| | | | |
|---|---|---|---|
| 43 41 213 A1 | 12/1993 | Germany | B60K 31/00 |
| 44 08 349 A1 | 3/1994 | Germany | B60T 1/087 |
| 2 018 374 | 4/1979 | United Kingdom | B60K 41/26 |
| WO 94/27845 | 5/1993 | WIPO | B60T 1/087 |

OTHER PUBLICATIONS

Article Die neue Dekompressionsventil–Motorbremse (DVB) von Mercedes–Benz MTZ Motortechnische Zeitschrift 56 (1995) 7, 8.

Article KFZ–Anzeiger Jahrgang Einzelpreis 5, 75 DM (1994).

*Primary Examiner*—Dirk Wright
*Attorney, Agent, or Firm*—Taylor & Aust, P.C.

[57] ABSTRACT

A system for regulating a retarder, in particular a primary retarder in a vehicle, includes at least one control-regulator unit, a device for picking up measuring signals in order to detect gear speed settings, and at least one actuator for setting the retarder braking movement. The regulating system is characterized in that, on the basis of the measuring signals for detecting gear changes, the at least one control-regulator unit controls the at least one actuator for setting the retarder braking moment, such that the braking moment of the retarder does not exceed the maximum permissible braking moment ($M_{maxR}$ or $M_{maxHA}$) for a given driving speed.

16 Claims, 8 Drawing Sheets

Overview of the input signals

| Nr | Labeling | I/O | H/L | Description |
|----|----------|-----|-----|-------------|
| 2 | Vist | AI | | Current Vehicle Speed |
| 3 | $n_{motor}$ | AI | | Engine Speed |
| 4 | Clutch | DI | | Clutch signal on/off |
| 6 | $M_{Mot} = 0$ | DI | | Signal Engine Torque = 0 or >0 |
| 8 | Idle | DI | | Idle signal on/off |

Fig. 4

| Function in-/output | Principal Function | |
|---|---|---|
| | Braking Mode<br>G2 | v-constant<br>(M>0)<br>G3 |
| proportional control valve | on<br>(Voltage depending on braking mode) | on<br>(Voltage controlled to Vist = Vsoll) |
| By-Pass Valve | on | on |

Fig. 5

| in-/output | Function | Braking Operation – Clutching + Changing Gears (M2) | M-Adaptation Due To: Accelerate (Provide Fuel) (M3) | M-Adaptation Due To: Low Engine Speed (M4) | M-Adaptation Due To: High Engine Speed, Low Gear (M5) |
|---|---|---|---|---|---|
| input | Clutch | on | | | |
| input | Gas Pedal ($M_{Mot} > 0$) | | on | on / off | |
| input | nmotor | | | $< n_{min}$ | |
| input | HA $M_{max}$ | | | | on |
| output | proportional control valve | off | on if G2 / off if G3 | off | corresponding G2, G3 |
| output | By-Pass Valve | on | | on / off | corresponding G2, G3 |
| Comments (Calculated from Vist, nmotor and EOL parameters) | | $M = M_{min}$ | $M = M_{min}$ | $M = M_{min}$ / $M = 0$ | Attention: Neutral Gear Cannot Be Recognized |

Fig. 6

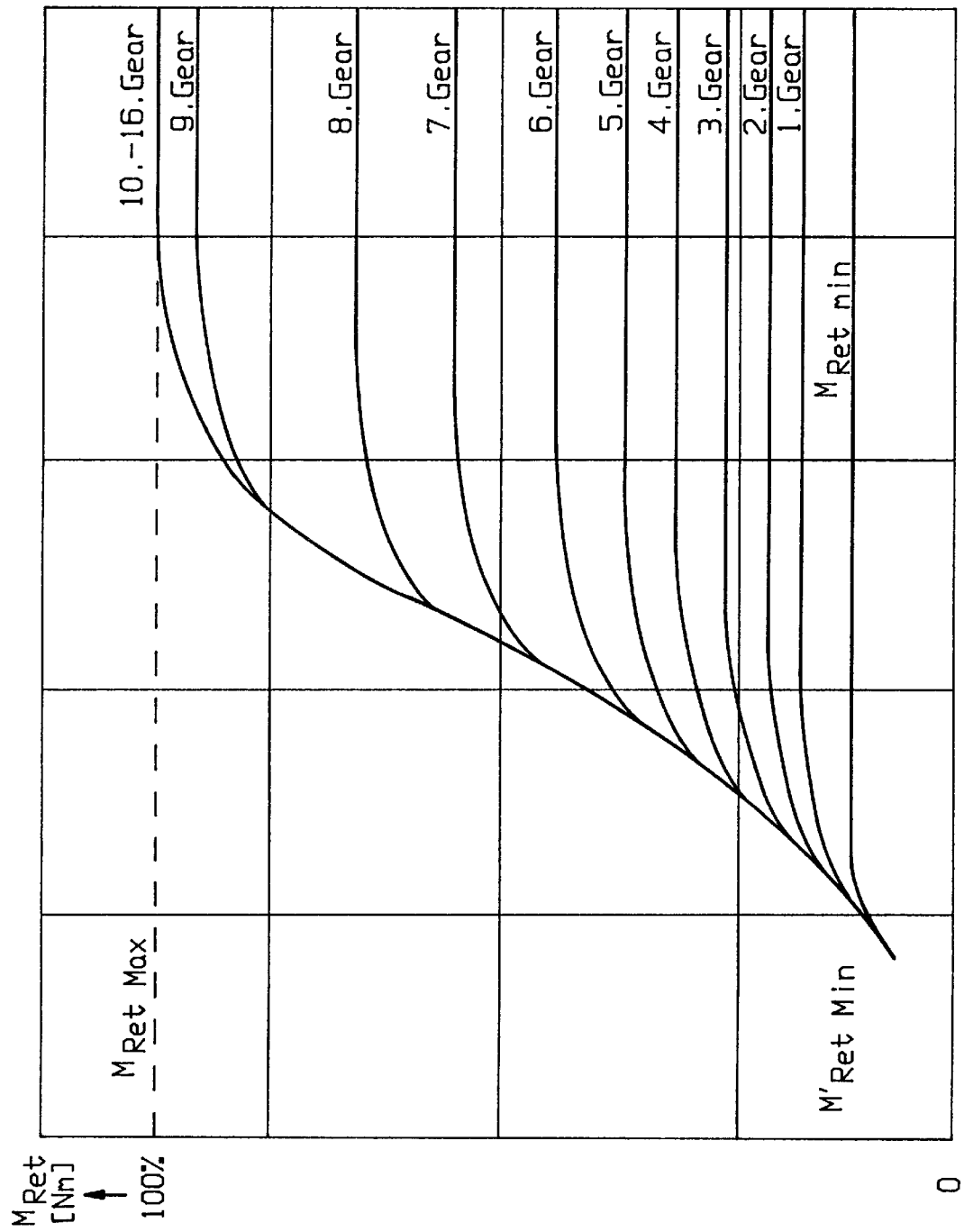

SYSTEM FOR ADAPTING THE BRAKING MOMENT OF A PRIMARY SYSTEM AS A FUNCTION OF THE GEAR SPEED SETTING

BACKGROUND OF THE INVENTION

1. Field of the Invention

The present invention relates to a control device for a primary braking system, more particularly, to a primary retarder in a vehicle, as well as to a method to control a primary braking system.

2. Description of the Related Art

Primary braking systems generally refer to braking systems which are positioned in front of the clutch and the transmission. (Ref. Kfz-Anzeiger. 44th year, 1991, report: "Safely Downhill", page 30 and Lastauto Omnibus April 1991, report "Against the Current", page 30). Secondary braking systems, on the other hand, are mounted directly on the transmission or in the drivetrain downstream of the transmission, and act on the rear axles of the vehicle.

Next to primary retarders, there are the following additional primary braking systems that have become well-known in the industry: Guillotine-type exhaust brake, bleeder brake compression release brake.

The guillotine-type exhaust brake relies on the increased backpressure to generate the braking torque. During braking, the exhaust piping is nearly fully-blocked in order to impede the outflow of the cylinder charge during the exhaust stroke, thus elevating the braking power of the engine.

The bleeder brake (Ref. Kfz-Anzeiger. 44th year, 1991, report: "Safely Downhill", pages 10–13) is a type of brake which utilizes an additional valve, a so-called decompression valve which is integrated into the cylinder head. When activated during the third stroke of the cycle, it substantially lowers the expansion pressure acting on the piston and, thus, lowers the acceleration of the piston. Therefore, a difference develops between the compression and expansion work, which can be used to increase the braking power of the engine. In particular, such a braking system can be modulated by controlling the throttle positions.

In a further development of the bleeder brake, the decompression valve is not kept open during the entire working cycle, but only during a short time span (ref MTZ Motortechnische Zeitschrift 56 (1995) 7/8 pages 418–423; "The New Decompression Release Brake (DVB) from Mercedes Benz").

The control of such an engine brake can be performed by a proportional control valve, serving the function of a pressure control valve with the capability of affecting the opening characteristics of the decompression valve.

For further details, the above indicated article of the MTZ Motortechnische Zeitschrift 56 (1995) 7/8 page 422 is recommended as reference.

The compression release brake is, just like the bleeder brake, an engine brake. In the case of the compression release brake, a valve control device releases the compression, which leads to—as with the bleeder brake—a substantial increase in engine brake power (ref Kfz-Anzeiger, 47th year, January 1994, report: "Elegantly Packaged—Test Report Volvo FH", pages 10–12).

While the control device and the control method, in accordance to the present invention can be, as indicated above, applied to any primary brake systems, primary retarders also provide a unique application for this invention. It is, unlike the secondary retarder which is normally mounted between the transmissions and the propeller shaft, acting directly on the engine, as already described above. A primary retarder, which is permanently connected to the engine, is known from German Patent Document DE 44 08 349, incorporated herein by reference.

There are two principal operating modes available for the retarder during braking operations: "Braking mode" or "V-constant". The basic function "braking mode" is characterized by a fixed brake setting of the retarder. This can be achieved by use of a hand brake lever or a foot pedal, which, based on a fixed correlation, achieves a certain braking torque, which can range from a minimum braking torque $M_{min}$ to a maximum braking torque $M_{max}$.

While operating the brake at "V-constant", the retarder can be, from a controls standpoint, coupled with the cruise control. The retarder braking action is achieved by adjusting the braking torque, so that a constant speed can be achieved, i.e., during downhill operation.

Control devices or methods for the control of a retarder, with respect to its braking torque, have been published in German Patent Document DE 43 41 213, which is incorporated herein by reference.

In order to avoid a conflicting operation between the retarder and the engine, i.e., at elevated speeds, German Patent Document DE 43 41 213 proposes to establish a relative priority of the individual systems for specific applications. For example, it is proposed to always yield the priority to the retarder in case the throttle and retarder are activated simultaneously. If the "constant velocity" function of the retarder is activated, the application suggests moving the throttle lever of the engine to the idle position.

Due to the direct connection, the braking torque of a primary braking system always correlates with the engine speed. The braking torque of a primary braking system which is mounted on the axle or drive wheels increases with the overall gear ratio of the transmission. This causes the braking moment acting upon the braking wheels to be—under some circumstances—exceeded while braking in low gear during downhill operation, leading to unacceptable wheel slips.

SUMMARY OF THE INVENTION

The present invention offers a control device as well as a control method for a primary braking system, in particular, a retarder, but also for a compression release brake, which avoids the problems associated with the state-of-the-art devices.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 4 is a table of the input signals (sensor signals), to the control/regulator unit per FIG. 3;

FIG. 5 is a table of the inputs and outputs in the principal operating modes of the retarder;

FIG. 6 is a table of the input and output signal configuration of the control/regulator unit per FIG. 3, in the respective operating situations during braking;

FIG. 9 is a time-history diagram of the retarder braking torque in relation to the vehicle speed and engine speed.

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
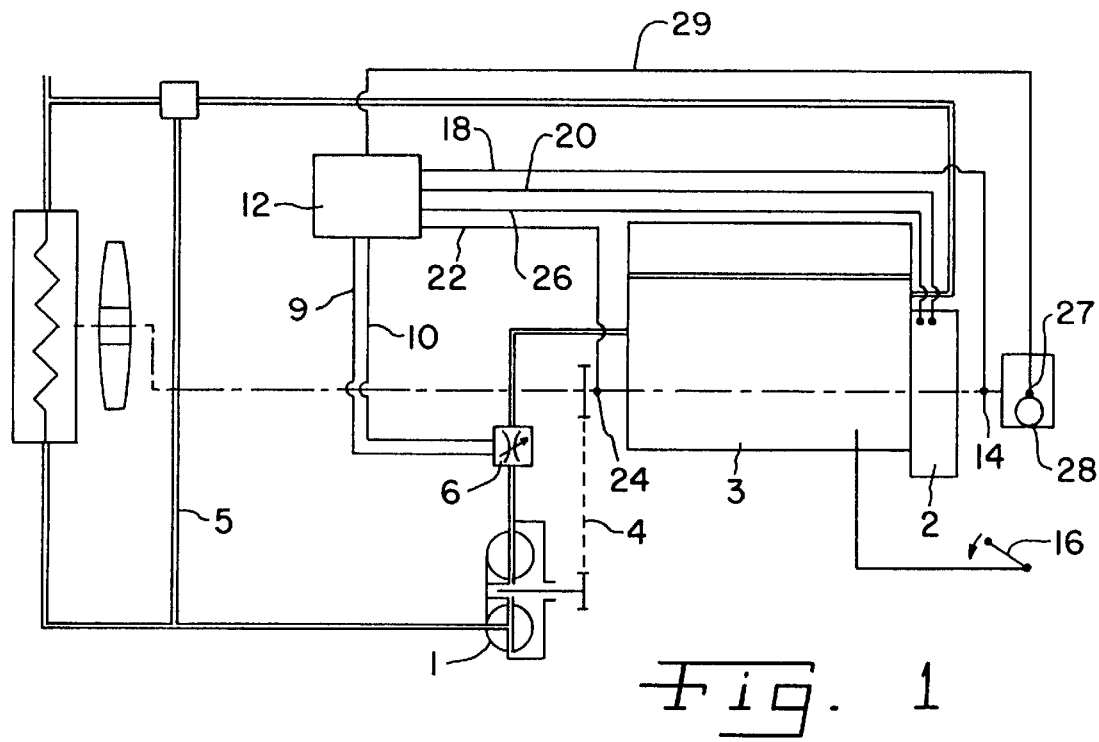
FIG. 1 is a schematic diagram of one embodiment of a primary retarder with a control device in accordance to this invention.

Referring now to the drawings and particularly to FIG. 1, there is shown a representative drawing of a primary retarder, including the control/regulator unit 12 as described in German Patent Document DE 44 08 349, which is incorporated herein by reference. Retarder 1 is positioned in front of transmission 2 of engine 3. Retarder 1 is permanently linked to engine 3, more particularly, the crankshaft of the engine 3. In this particular case, the retarder is permanently linked to the engine 3 via gear reduction unit 4. Retarder 1 and engine 3 use the same cooling circuit 5. The coolant medium of cooling circuit 5 also serves as the working fluid for retarder 1 in the embodiment presented. The retarder is designed to operate when completely filled with operating fluid. Due to the placement of the retarder downstream of the transmission 2, the retarder remains permanently linked to the engine 3 during all operating modes, which means that it can also function as a pump to recirculate the coolant medium. During normal operation, i.e., when the retarder is not activated, it serves to circulate the coolant medium within cooling circuit 5. During non-braking operation, valve 6 has a relatively large through-flow area, so that the coolant medium can be pumped through the cooling circuit at minimum flow resistance.

During braking operation, valve 6 has only a small though-flow area for the coolant medium to be pumped through the cooling circuit 5. This makes it possible to build up pressure inside the retarder for the generation of braking torque. Valve 6 can be a continuously variable flow control valve, making it feasible to achieve continuously variable control of the braking torque. It is also feasible to control the braking torque in step-like manner with an appropriately controlled valve.

The continuously variable flow control valve or proportional control valve 6 is controlled by control/regulator unit 12 (preferably a microprocessor) via control lines 9, 10. Control lines 9, 10 serve to transmit the control signals for the continuously variable adjustment of the retarder braking torque by use of the proportional control valve 6. It is customary to use voltage signals for lines 9, 10.

The control of valve 6 is performed via control lines 9, 10 in response to the control signals associated with the control/regulator unit 12.

In the present embodiment, vehicle acceleration or throttle activation is signaled via a first sensor 14. For that purpose, a signal of the engine torque is recorded, whereby, a signal of $M_{mot}>0$ indicates "accelerating" and $M_{mot}=0$ indicates all other operating modes. If the fuel flow to the engine 3 is increased by moving the throttle lever 16 and the vehicle is accelerated, the fuel sensing line 18 provides an "ON-signal" to the input of controller 12. In all other cases the signal is an "OFF-signal".

In addition to the sensor input indicating that the vehicle is being accelerated, there are other sensor inputs used by control/regulator unit 12 for the control of valve 6. The second sensor input relates to the operating state of the clutch whose purpose is to separate the drivetrain from the transmission 2. This sensor input is taken at the clutch unit 2 and is transmitted to the control/regulator unit 12 via the clutch state sensing line 20. If the clutch 2 is in the engaged state, clutch state sensing line 20 provides an "OFF-signal" to the input of control/regulator unit 12; in all other cases, it provides an "ON-signal" to the control/regulator unit 12.

A third sensor input to the control/regulator unit 12 for the control of valve 6 includes the engine speed signal, which is received via sensor 24 from a pick-up location on the alternator.

In a first embodiment of this invention, a direct recognition of the gearshift position is proposed; whereby the gearshift position recognition signal is transmitted to the control/regulator unit 12.

Figure 2:
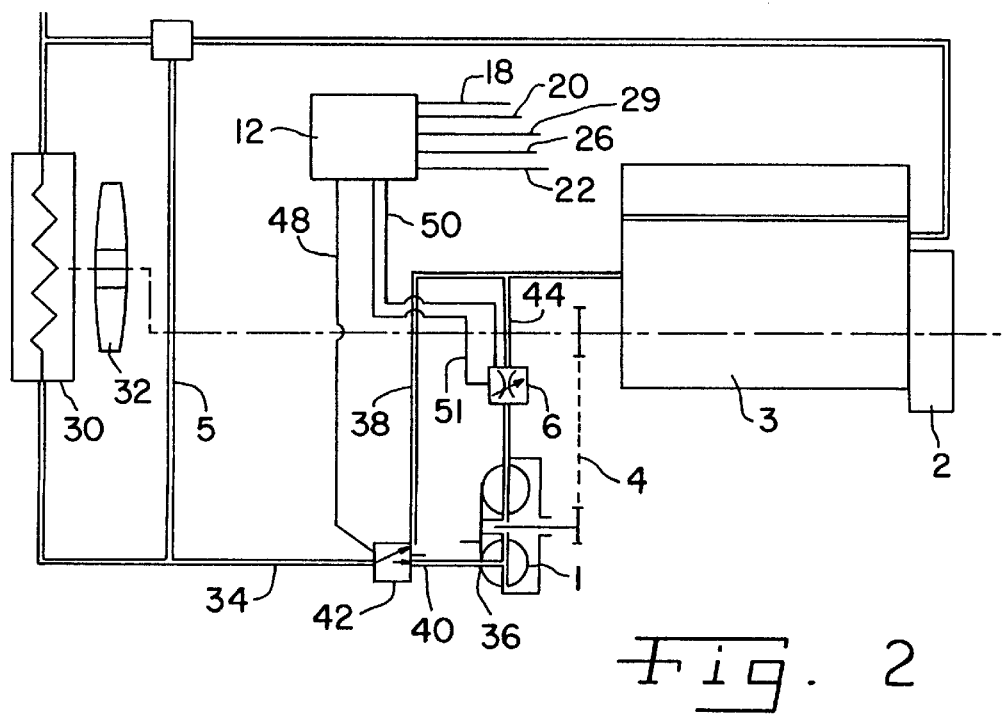
FIG. 2 is a schematic diagram of a further embodiment of a primary retarder including a control device in accordance to this invention.

The embodiment shown in FIGS. 1 and 2 does not allow a direct gearshift position recognition. The selected gear is recognized by several independent signals, which are transmitted to the control/regulator unit 12. These signals include the current engine speed signal values associated with line 22 and obtained by sensor 24, as well as a sensor signal, which reflects the current vehicle speed.

The vehicle speed sensor signal can be obtained on a vehicle axle 28 by use of a speed sensor 27 and is supplied to the control/regulator unit 12 via speed sensing line 29.

If further vehicle-specific values are known, such as transmission type, the size of the tires, and the rear axle ratio, the current gearshift position can be calculated with an appropriate algorithm, using engine speed and vehicle speed sensor as inputs.

Knowledge of the type of transmission can, for example, be used to determine the individual gear ratios of the respective gearshift positions.

It should be pointed out, however, that the above-described method of gear recognition only allows the recognition of gearshift positions. The neutral gearshift position cannot be recognized with this method.

Therefore, an additional sensor signal from the transmission 2 must be provided to the control/regulator unit 12 via line 26.

If the direct sensing of a neutral gearshift position is not feasible, then the speed signal supplied via line 22, can be used to prevent a wrong gearshift position calculation per the above described method, which would ultimately lead to an undesired application of braking torque. To that end, an excursion below a pre-defined minimum engine speed can be used for the control/regulator unit 12 to switch the proportional control valve 6 in the OFF-position, which means a brake torque reduction occurs.

FIG. 2 illustrates a second embodiment of a primary retarder 1, which is representative of a primary system with a control device in accordance to this invention.

The power plant including engine 3, transmission 2 and retarder 1 is substantially the same as depicted in FIG. 1, and the same reference numbers are used for the same componentry. Retarder 1 is in permanent connection or fixedly attached to the engine 3, more particularly, to the crankshaft of the engine 3. In the presented case, the permanent connection is achieved with a gear reduction unit 4. Cooling circuit 5 includes a cooler 30 including fan 32. FIG. 2 includes a modification of the embodiment of FIG. 1, namely a different valve arrangement for the setting of the fundamental operating modes of the retarder 1. The line from the cooler outlet to the fluid inlet at the retarder 1 branches at point 40 into supply line 36 to the retarder 1 and by-pass line 38. Point 40 is associated with a by-pass valve 42, preferably a 2-way directional control valve. Depending on the principal operating mode, the valve 42 is switched so that the coolant medium either by-passes the retarder 1 via the by-pass line 38 or passes through the retarder 1. The by-pass line 38 is open whenever the vehicle is driven in a non-braking mode. FIG. 1 shows valve 6 positioned in line 44 leading from the retarder 1 to engine 3. This valve 6 allows a continuously variable adjustment of the retarder braking torque during the braking mode. This valve 6 is preferably a control valve, which can adjust the degree of filling of the retarder 1 and thus, the braking torque on a continuously variable basis. There are advantages if this control valve 6 is designed as a proportional control valve.

The by-pass valve 42, as well as control valve 6, are connected to the output of control/regulator unit 12 via control lines 48, 50 and 51. The input side of control/regulator unit 12 receives a total of 5 sensor input signals via control lines, as shown in the example of FIG. 1. These inputs include the sensor input received on sensing line 18 signaling a fuel delivery state, the sensor input received on sensing line 20, signaling the state of the clutch, the sensor input received on sensing line 22, signaling the rotational speed of the engine, the sensor input received on sensing line 29, signaling the actual value of the vehicle speed, and in a more advanced design, sensor input received on sensing line 26, signaling the neutral gearshift position of the transmission 2.

Figure 3:
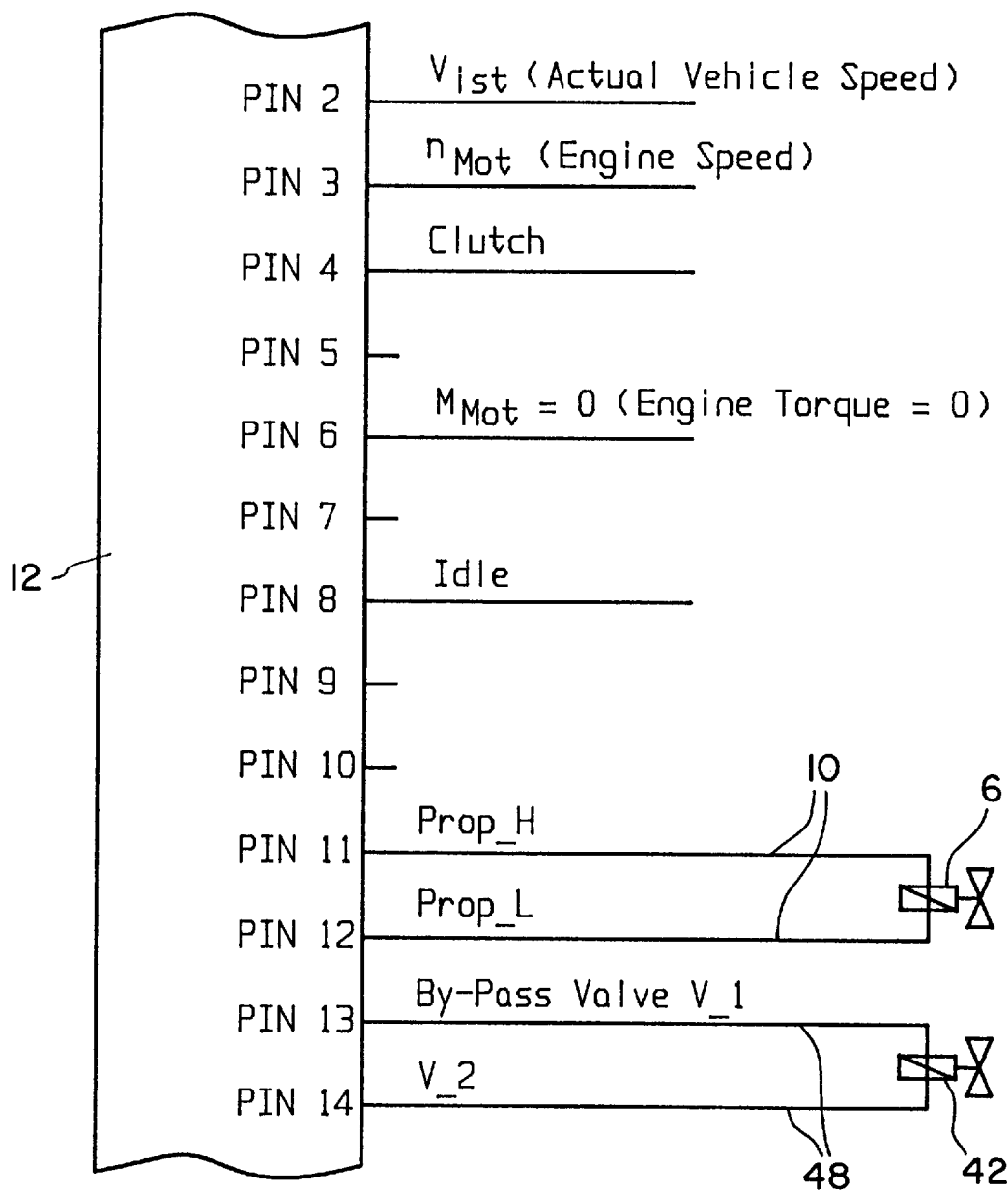
FIG. 3 is a fragmentary schematic diagram of the control/regulator unit of FIGS. 1 and 2 with the appropriate input configurations.

FIG. 3 shows an example of the individual connections of the control/regulator unit 12, which are of relevance in the present case. As can be seen from FIG. 3, the input of control/regulator unit 12, serving as a microprocessor, is supplied with a load sensor signal, a fuel delivery state (throttle position) sensor signal, a clutch state sensor signal, as well as an engine speed sensor signal.

On the output side, connections 11 and 12 are linked to control valve 6—in this particular case is a proportional control valve—via lines Prop-H and Prop-L.

In the sections below, the term proportional control valve will be used to describe any type of control valve design, without the intent of conveying any limitations.

Connections 13, 14 are connected to by-pass valve 42 via lines By-pass valve V-1 and V-2 as shown on FIG. 2 depicting the by-pass arrangement.

The control of the proportional control valve 6, in accordance to the desired setting of the braking torque, can be accomplished, as shown in the presented exemplification, via control lines Prop-H and Prop-L, by use of an operator switch having the capability of being placed in different positions to achieve the desired braking torque on a continuously variable basis.

Valve 6 has the capability to adjust its through-flow area, in accordance to the selected braking level, by use of the signals transmitted on lines Prop-H or Prop-L.

FIG. 4 depicts an overview of the input signals, which can be retrieved by a CAN-Bus and input to microprocessor 12.

Signal No. 2 can be an analog signal and reflects the current speed of the vehicle. Signal No. 3 is designated for the engine speed and can be, for example, a frequency signal. Signal No. 4 is designated for the clutch state and is, preferably, a digital signal, describing the clutch state in form of an "ON" or "OFF". The sensor signal "accelerate" or vehicle acceleration can be, as described previously, a signal derived directly from the engine torque. A torque >0 indicates "accelerate" and a torque of near 0 indicates the remaining operating modes. In an alternative design, it is also feasible to directly sense the throttle pedal position in order to derive an appropriate sensor signal.

The optional neutral gearshift position signal No. 8 is an indicator of whether the transmission is in neutral.

Column 2 of FIG. 5 shows the configuration of the control/regulator outputs in the principal operating mode "braking".

The function braking mode (G2) produces a braking moment, corresponding to the position of, for example, a hand brake lever or foot pedal according to this relationship—$Mret_{min} < MRet_{RSS1} < \ldots MRet_{RSSn} < Mret_{max}$.

When operating in the principal operating mode V-constant (G3), where the braking torque is >0, there is a linkage or communication to the engine control electronics. In the principal operating mode G3, the proportional control valve 6 is switched to the ON-position and, based on the vehicle speed command, the proportional control valve 6 is controlled in such a manner that $V_{actual} = V_{commanded}$.

The control element, which is simply a proportional control valve 6 per the arrangement shown in FIG. 1, or a proportional control valve 6 and an additional by-pass valve 42 for activation of the bypass line 38 as shown in FIG. 2, is controlled in certain operating modes by the control/regulator unit 12 in response to the input sensor signals, of which there are four listed in the first three columns of the table in FIG. 5.

The matrix of FIG. 6 exemplifies the input and outputs of the control/regulator unit's microprocessor for various operating modes.

Column M2 depicts the adaptation logic of the braking torque with respect to the clutch state. This adaptation occurs when the clutch pedal is depressed, which means the driving rotating components are separated from the driven rotating components. In this case, the output to the proportional control valve issues a signal causing the proportional control valve 6 to switch to the OFF-position, which means that only minimum braking torque is generated by the retarder 1.

The case presented in column 3, torque adaptation is achieved when the internal combustion engine is supplied with fuel, that is, the throttle lever 16 is adjusted to increase the amount of fuel provided to the engine 3. In this case, the engine 3 should not be operating against a retarder load. The "accelerate" signal is provided in form of engine torque, which in this case is >0. If this is the case, the sensor signal responsible for the state of the throttle is set to ON. If such a signal is attached to the input of microprocessor 12, the output signal of the microprocessor to the proportional control valve 6 is set to an OFF state. In a design variation shown in FIG. 1, which includes only one proportional control valve 6 as control element minimum retarder braking torque is achieved when the proportional control is in the OFF position. In a design according to FIG. 2, which includes an additional by-pass valve 42, there are two control possibilities to achieve torque adaptation during acceleration. In principal operating mode G2, which relates to a fixed braking mode, the by-pass valve 42 is in the ON-position, which means that the by-pass loop is shut off. In this operating mode, the retarder 1 is operated at minimum retarder braking torque $M_{min}$. Alternatively, in the principal operating mode G3 which relates to a constant speed operating mode, the by-pass valve 42 is in the OFF position, which means that the by-pass valve 42 opens the by-pass loop. The braking torque applied to the engine 3 is near zero. Depending on the position of the by-pass valve 42, a different level of reduced braking torque can be achieved.

The third operating mode (M4) which requires torque adaptation during the braking mode, occurs when the engine 3 falls below a certain rotational speed threshold $n_{min}$. This can be the case with the clutch 2 engaged or disengaged. If the engine speed falls below a certain minimum speed, the control/regulator 12 initiates the proportional control valve 6 to be switched to the OFF position where it remains. If there is a by-pass valve 42 in addition to the proportional control valve 6, then it is feasible to realize the following two operating modes: one mode with the by-pass deactivated, resulting in a retarder torque that corresponds to the minimum retarder torque; the other mode is realized with the by-pass activated, allowing the braking torque working against the engine to drop to nearly zero.

In the fourth operating mode (M5), which requires torque adaptation, the case is considered in which the vehicle operates at a fixed braking level (principal operating mode G2) or v-constant (principal operating mode G3), at high engine speed and low gear causing the retarder 1 to generate more braking torque than the permissible braking torque $MGW_{maxR}$ or $MGW_{maxHA}$, which can be absorbed by the wheels or axles. This maximum permissible torque depends on various vehicle-related parameters. As such, the maximum permissible torque on the rear axle is, among other things dependent on the vehicle load.

In the embodiments that are under consideration here, which do not include direct gearshift position recognition, sensors are used to monitor the current vehicle speed as well as the engine speed. By use of these sensor signals, as well as additional fixed vehicle-specific parameters, such as transmission type, rear axle ratio and type of propulsion, the respective gearshift position can be determined mathematically.

If the maximum allowable braking torque $MGW_{maxR}$ or $MGW_{maxHA}$ to the wheels or axles is exceeded as a result of excessive engine speed in conjunction with operating in a low gear (as obtained by the gearshift position calculation), then the braking torque of the retarder 1 is reduced in accordance to the logic shown in column M5 to a level less than the maximum allowable braking torque to the wheels of $MGW_{maxR}$ or $MGW_{maxHA}$.

This is accomplished by generating an input signal $MGW_{maxHA}$, preferably an analog signal, which, as output signal controls the proportional control valve 6 and the by-pass valve 42 in accordance to the principal operating modes G2 and G3 to the maximum allowable braking torque for the respective gear that is selected.

In this context, it is feasible that, in the case of a throttle control valve, that maximum flow area reduction is commanded, and therefore, the maximum possible retarder braking torque (for the respective gear) $MRET_{max}(G) = (MRET_{max}*G\%)/100$ is generated. The maximum allowable retarder braking torque for the respective gear $MRET_{max}(G)$ is mostly listed as a fraction of the maximum retarder braking torque $Mret_{max}$ that is achievable with the vehicle in highest gear.

In a case where a neutral gearshift position cannot be recognized a control logic, such as the one described above, would lead to an erroneous braking torque reductions. This can be avoided by employing a signal that is generated whenever the engine speed falls below $n_{min}$ (ref Column M4), which leads to a deactivation of the engine brake.

With the above-described control process, an erroneous gearshift position recognition, is, by-and-large harmless due to braking torque reduction to $MRet_{min}$ which always occurs with the transmission in neutral.

Figure 7:
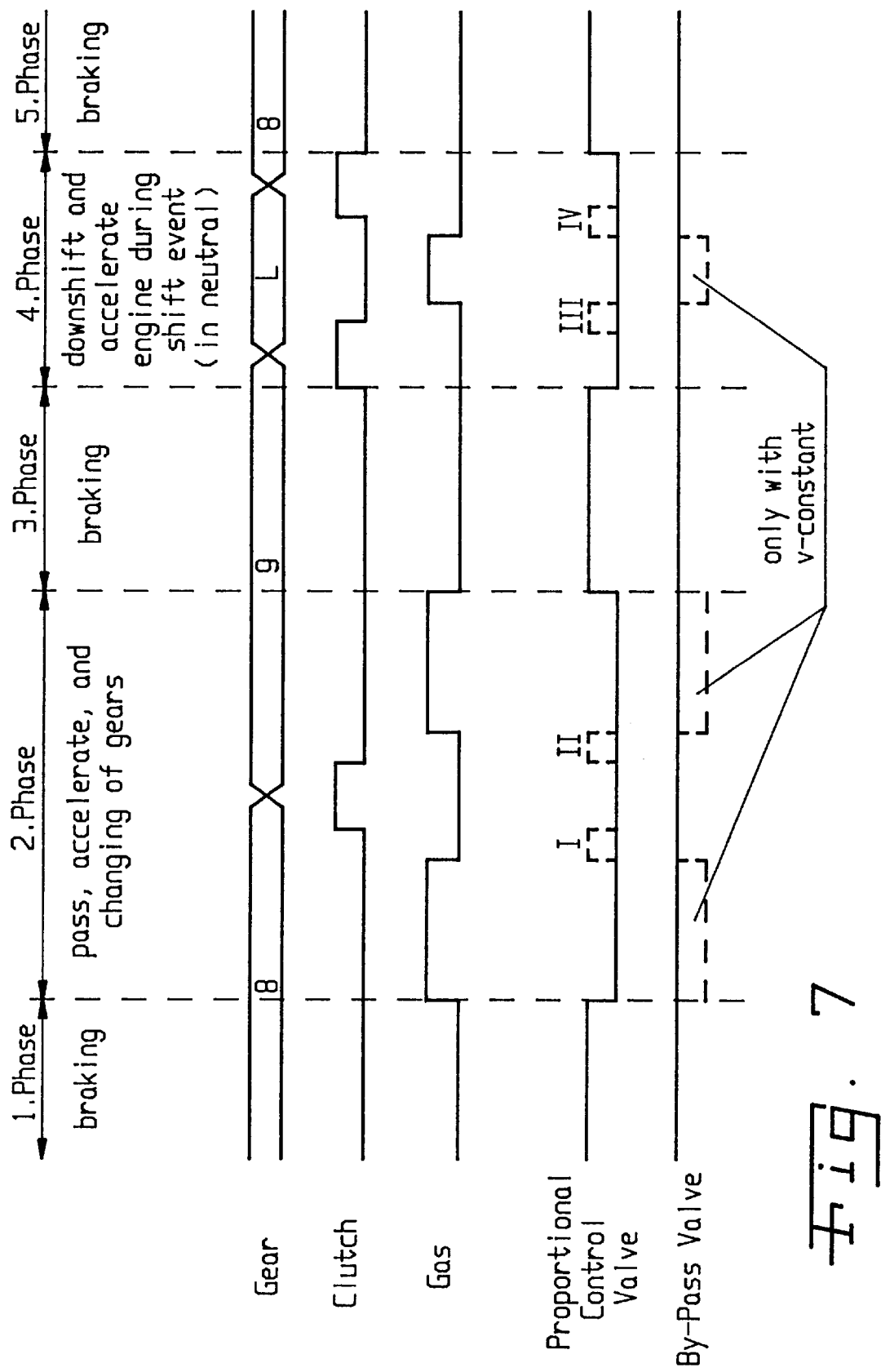
FIG. 7 is a plot of a simulated operating cycle over time with the input and output signals to the control/regulator unit, in accordance to this invention.

FIG. 7 shows an example of the input signals for clutching and accelerating, as well as the output signals for the proportional control valve 6 and the by-pass valve 42. These signals are all associated with the input/output circuitry of the control/regulator unit 12, serving the function of a microprocessor and are depicted in relation to various operating modes as a function of time.

The logic convention in FIG. 7 is the same as indicated previously; an ON-position of the valve equals a logical ONE, an OFF position of the valve equals a logical ZERO. It is to be understood that the ON and OFF positions can also be provided with other signals.

FIG. 7 illustrates various possible operating modes, which can be encountered during downhill operation while the retarder 1 is in operation. Also shown are the principal operating modes of a fixed braking mode (G2) as well as a constant speed mode (G3).

In the first phase of the operating simulation, the vehicle is moving in eighth gear. The vehicle is in the operational mode "braking" by the retarder 1. During this mode of operation, the driving rotating components are connected to the driven rotating components. The resulting signal for the clutch state is ZERO. Since no acceleration takes place during braking, the sensor signal for the throttle position—in the presented case a throttle pedal—is also assigned a logical zero.

The output signal to the proportional control valve 6 is assigned a logical ONE, which means that the proportional control valve 6 is activated or in the ON state. For a fixed pre-set braking level, a certain proportional voltage signal is set corresponding to the braking level. For the case which calls for a constant speed, microprocessor 12 controls the proportional voltage signal of the proportional control valve 6 so that $V_{actual}=V_{target}$. The signal for the by-pass valve 42 is assigned a logical ONE, which means that the by-pass valve 42 is not activated.

If the vehicle is accelerated after the braking phase and is subsequently shifted into a different gear, then the input and output signals of FIG. 7—phase 2 applies.

As long as a gear is engaged, the signal for the clutch state is assigned a logical ZERO. In the event the clutch 2 is activated, the signal assigned to the clutch state changes to a logical ONE. During the time period in which the clutch state signal remains a logical ONE, the proportional control valve 6 is deactivated (logical ZERO), as evidenced in the input-output matrix vs, operating modes, column M2 of FIG. 5.

If, during the acceleration process and prior to any shift events, the throttle pedal is activated (ref. FIG. 7), then the throttle position signal to the microprocessor is assigned a logical ONE, which, in accordance to the matrix of FIG. 5, operating mode M3, assigns a logical ZERO to proportional control valve 6; this translates to a braking torque reduction during this time period.

The signal of the by-pass valve 42 for the braking mode is always at a logical ONE, which means that the by-pass loop is closed off, as evidenced by the straight line depicting the operational state of this valve 42. This, however, is only valid for the principal operating mode 2, indicating a fixed braking level. If the vehicle operates in principal operating mode G3; that is, the vehicle is moving at constant speed, then the by-pass valve 42 is set to a logical ZERO while the throttle pedal is activated, which in turn, opens the by-pass loop.

As can be gleaned from the time-history graph for the proportional control valve 6, the valve is assigned a logical ONE and, therefore, is activated for the duration of time in which the throttle pedal is not activated and the clutch pedal is not yet activated. This condition is shown in dashed line in the second phase of the time-history graph and labeled with the Roman Numerals I and II. A retarder braking torque is, at this stage, undesirable. In order to reduce the braking torque during the entire shift event, that is, the time period between shutting off the fuel supply to the engine 3 prior to the clutch event, and the subsequent increase in fuel supply to the engine 3 after the clutch event, the invention provides a time-delay element or "ramp" which assures that no rapid retarder activations can occur. An activation of the retarder 1 occurs phase-shifted with respect to the sensor signal. If the retarder 1 is activated in response to, for example, a change in the throttle signal from a logical ONE to a logical ZERO in a delayed fashion, then the activation of the proportional control can be—for a situation exemplified by the second phase—avoided for a duration of time labeled by Roman Numeral "I".

It is equally feasible to activate the retarder 1 in response to a change in the clutch signal from a logical ONE to a logical ZERO in a delayed fashion. This way, the undesirable signal having the duration of time labeled by the Roman Numeral "II" in the second phase, can be avoided. Because of these time-delay elements, it is possible—as described by this invention—to maintain the retarder braking torque at the minimum level during gearshift events or to assure a reduction in the braking torque.

The third phase of the presented driving cycle once again simulates a braking scenario. Since the throttle is in a non-activated state during braking, the throttle sensor signal changes from a logical ONE to a logical ZERO. In accordance to the assignments of the input and output functions, this has the consequence that during the braking mode the proportional control valve 6 changes from the OFF to the ON state and, henceforth, provides the desired braking action. For the principal operating mode G3 which provides a constant vehicle speed, this change to the input to the control device 12 provokes a change to the output, causing the by-pass valve 42 to switch from the "by-pass" mode to the "retarder" mode, as indicated with the dash-point-dash line in FIG. 7, representing the change of this value over time.

Adjacent to the third phase, which simulates a braking scenario, is a fourth phase, which simulates a driving scenario in which the vehicle is shifted from a higher to a lower gear. When shifting to the lower gear, the clutch event is supported by a brief engine speed excursion (double clutch concept).

This means that, at first, the clutch pedal is depressed. This causes the clutch state input signal to the control device to switch from a logical ZERO to a logical ONE, which, according to the table of FIG. 5, leads to torque adaptation per case M2. This has the consequence that the output signal to the proportional control valve 6 is assigned a logical ZERO, resulting in the proportional control valve 6 to be switched to the OFF position and causing the retarder 1 to provide only the minimum of braking torque. After the first clutch event, the engine 3 is accelerated, followed by a second clutch event while the transmission 2 is in neutral. Due to the second clutch event, the clutch state signal to the input of the microprocessor changes from a logical ONE to a logical ZERO. This has the consequence that the torque reduction is no longer effective and the output signal to the proportional valve 6 is set to a logical ONE, causing it to be activated and, therefore, creating an undesirable braking torque.

This undesirable braking torque, (shown by the dash-point-dash line and labeled with the Roman Numeral III) for the proportional control valve 6 continues to build until fuel is applied to the engine 3. As a result of the engine acceleration, torque adaptation (ref. FIG. 5) is activated, meaning the throttle state input signal, having been set to a logical ONE, leads to the output to the proportional control valve 6 to be set to a logical ZERO and, therefore, to the generation of minimum retarder torque ($Mret_{min}$) when the vehicle is operated at a fixed braking level (G2). This undesirable build-up of braking torque for the time period between clutching and the renewed engine speed increase, can be avoided in different ways. One solution includes—as mentioned above in the description of the second phase—a time-delay tactic in form of a ramp for the activation of the retarder 1.

Alternatively, it is feasible—if a neutral gearshift position can be recognized and submitted to the microprocessor in form of an input signal—to control the proportional control valve 6 by setting the output to the proportional control valve 6 to a logical ZERO during the entire period of time in which the neutral gearshift position signal is present at the input to the microprocessor. This has the consequence of deactivating the proportional control valve 6 and, hence, reducing the braking torque to the minimum braking torque level.

In case a neutral gearshift position recognition is not feasible, then a fall-off in engine speed below a pre-defined minimum engine speed threshold can be used as an input signal—independently from the clutch state (ref. FIG. 6, columns M)—to set the output signal to the proportional control valve 6 to a logical ZERO. This achieves an immediate reduction in braking torque, thus avoiding the retarder 1 being operational while the transmission 2 is in neutral.

When downshifting from the higher gear ($9^{th}$ gear) into the lower gear ($8^{th}$ gear) this invention assures that the maximum allowable braking torque to the wheels or axles $MGW_{maxR}$ or $MGW_{maxHA}$ is not exceeded in the lower ($8^{th}$) gear (ref. $3^{rd}$ phase).

To this end, the gear selection is determined based on the current engine speed $n_{Mot}$, the recorded vehicle speed $V_{ist}$, as well as the type of transmission, type of propulsion and rear axle ratio and, if appropriate, any vehicle-specific values. In this case, the downshift maneuver from the $9^{th}$ to the $8^{th}$ gear occurs by a brief engine acceleration while the transmission 2 is in neutral.

Even though there is no neutral gear signal, the retarder 1 is regulated to $MRET_{min}$ during the shift event. If the bypass is activated, the retarder torque can be regulated to nearly zero (ref. comments above). A regulation to a $MGW_{maxR}$ or $MGW_{maxHA}$ level can only occur when the proportional control valve 6 is in the ON-position.

As can be seen in the fourth phase of the time-history diagram, the period in time after the engine 3 has peaked in speed and after a renewed clutch event, undesirable braking torque once again develops if none of the measures described above have been implemented. The braking torque is, as described above, the result of the proportional control valve 6 being activated via a control signal which is set to ONE. This undesirable condition is shown in the time-history diagram for the proportional control valve with a dash-point-dash line and labeled by the Roman Numeral IV. Just like the undesirable signal III, the build-up of a braking torque in this case can be avoided by implementing a time-delay during the activation of the retarder 1 in response to the throttle state signal changing from a logical ONE to logical ZERO. Alternatively, a neutral gearshift position recognition algorithm or a regulation to a lower level in response to the engine speed being too low could be applied here.

Adjacent to the fourth phase of the simulated driving cycle is the fifth phase, which reflects a braking operation in one of the principal braking modes—fixed braking level or a V-constant. As can be seen from the time-history diagram for the output signal to the proportional control valve 6, there is braking torque present, as would be expected.

Figure 8:
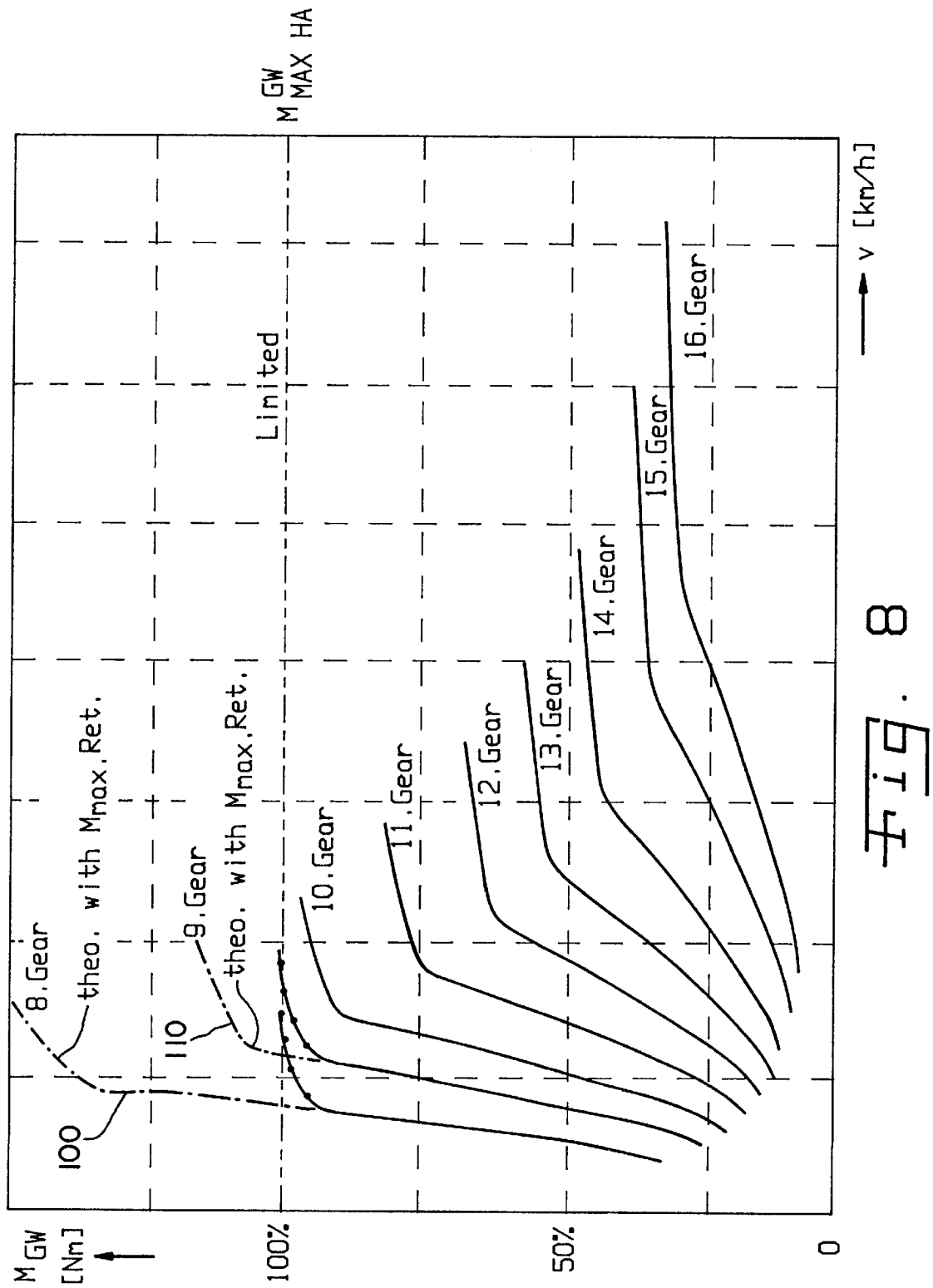
FIG. 8 is a time-history diagram of the braking torque on the rear axle in relation to the gear position and vehicle speed.

FIGS. 8 and 9 depict the regulation to the $MGW_{maxR}$, $MGW_{maxHA}$ level, the maximum allowable braking torque to the rear axle or rear wheels, as well as the behavior of the retarder braking torque Mret in relation to the engine speed.

FIG. 8 shows the behavior of the braking torque acting on the rear axle $M_{GW}$ in relation to the selected gear (here $8^{th}$ through $16^{th}$ gear) and vehicle speed.

In 10th through the 16th gear, the maximum allowable braking torque $MGW_{maxHA}$ is achieved at low vehicle speeds v (km/h). A regulation of the retarder torque to a lower level is not required.

In FIG. 9, the retarder braking torque characteristic curve for the $10^{th}$ through the $16^{th}$ gear achieves the maximum value $MRet_{max}$ (set to 100%)—in relation to the engine speed $n_{motor}$.

FIG. 8 shows the theoretical behavior of the braking torque on the rear axle or the rear wheels $M_{GW}$ in the $8^{th}$ and $9^{th}$ gear when the retarder torque is not limited. In this case, the braking torque $M_{GW}$ on the rear axle or rear wheels would exceed the maximum allowable braking torque $MGW_{maxR}$, $MGW_{maxHA}$ of the rear axle or rear wheels at certain vehicle speeds. This case is shown by the dash-point-dash lines 100 and 110, the theoretical braking torque lines $M_{GW}$ for the $8^{th}$ and $9^{th}$ gear (ref. FIG. 8).

When limiting the braking torque to the maximum allowable level of $MGW_{maxR}$, $MGW_{maXHA}$, the maximum retarder braking toque must be regulated to approximately 85% of $Mret_{max}$ in $9^{th}$ gear and to approximately 70% of $Mret_{max}$ in $8^{th}$ gear. For lower gears, the maximum allowable braking torque is correspondingly lower; for example, in first gear, the braking torque must be regulated to 15% of $Mret_{max}$, due to the high gear ratio of the transmission.

Because of the very low maximum allowable retarder braking torques $Mret_{max}$ associated with the low gears, this invention may not provide any regulation of the retarder torque to a predetermined, vehicle-specific maximum allowable level at certain low gears. The maximum allowable retarder braking torque in these gears would then be $MRet_{min}$ or zero, with the retarder 1 fully deactivated.

Thus, it is feasible to dispense with any regulation when the maximum allowable vehicle-specific braking torque is less than 25%, as is the case for the 2nd and $1^{st}$ gear in the example provided. This results in: No regulation to a lower level for the $10^{th}$ through the $16^{th}$ gear, since $MGW_{maxHA}$ is not exceeded. Limitation of the braking torque of the primary system for the $3^{rd}$ through the $9^{th}$ gear to the maximum allowable $M_{retmax}$(gear) for the respective gear. No regulation for the $1^{st}$ and $2^{nd}$ gear; that is $M_{Retmax}$ (gear)=$M_{Retmin}$; this can be achieved by deactivating the retarder 1 in those gears.

If a regulation to a 50% $M_{Retmax}$ level is no longer considered appropriate, then the retarder 1 could possibly be deactivated starting at the $6^{th}$ gear.

In case there is a primary braking system which has no regulating capability, as is the case with a Guillotine-type exhaust brake, then the invention could be tailored to include the following logic to avoid the maximum allowable braking torque ($MGW_{maxHA}$) to the rear axle to be exceeded: No regulation to a lower level for the $10^{th}$ through the $16^{th}$ gear, since $MGW_{maxHA}$ is not exceeded; full primary braking action is available. Deactivation of the primary brake (such as the Guillotine-type exhaust brake) for the $1^{st}$ through the $9^{th}$ gear; no primary braking torque is made available, since the $MGW_{maxHA}$ would otherwise be exceeded.

Depending on the specific requirements, the above-mentioned logic can be reformulated without fundamentally changing the fundamental concept of controlling a hydro-dynamic primary retarder, as exemplified above.

In reference to the above-described exemplification of a control concept applicable to hydrodynamic primary retarders, all curves relating to the retarder braking torques are shown in relation to engine speed $n_{motor}$ and are the result of the limitation of the braking torque to $MGW_{maxHA}$ or $MGW_{maxR}$ of the rear axle, as governed by the control logic in accordance to this invention.

The characteristic behavior of the braking torque on the rear axle or the wheels $M_{GW}$, resulting from the above-mentioned control logic, is depicted in FIG. 8 for the $8^{th}$ and $9^{th}$ gears; whereby the deviation from the theoretical curve is shown with the bold lines with the dark round symbols.

As can be seen from the above-mentioned description, the present invention makes it possible for the first time to prevent the maximum allowable braking torque ($MGW_{maxHA}$ or $MGW_{maxR}$) of a wheel or of an axle from being exceeded during a gear change while in braking mode.

Although the above description is primarily in reference to a primary braking system such as a retarder, in particular a hydrodynamic retarder, this invention is not limited to solely these types of devices. The term retarder can also include retarders which are based on the Eddy current concept (Ref.: Last Auto Omnibus Apr. 1, 1991 aa0). Furthermore, the control of all popular state-of-the-art engine brake systems, whether modulatable or not, can be achieved with the present invention.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

We claim:

1. A control apparatus for a primary retarder in a drivetrain of a motor vehicle, the drivetrain including a transmission with a plurality of gearshift positions, the primary retarder having a braking torque with a maximum allowable vehicle-specific value, said control apparatus comprising:

at least one sensor configured for transmitting at least one sensor signal;

a recognition device configured for receiving said at least one sensor signal and recognizing the gearshift positions of the transmission therefrom;

at least one actuator configured for controlling the braking torque of the primary retarder; and at least one control/regulator unit electrically connected to each of said recognition device and said at least one actuator, said at least one control/regulator unit being configured for controlling said at least one actuator in response to said at least one sensor signal such that the braking torque of the primary retarder is one of less than and equal to its, maximum allowable vehicle-specific value.

2. The control apparatus of claim 1, wherein said recognition device is configured for recognizing a currently engaged gear.

3. The control apparatus of claim 2, wherein said recognition device is configured for recognizing at least ore of:

a state of a clutch;

a state of fuel delivery; and an engine speed.

4. The control apparatus of claim 3, wherein said recognition device is configured for recognizing a current vehicle speed.

5. The control apparatus of claim 4, wherein said at least one control/regulator unit is configured for calculating the gearshift positions with a mathematical algorithm using an engine speed signal, a vehicle speed signal, and a plurality of vehicle-specific parameters.

6. The control apparatus of claim 5, wherein said recognition device is configured for recognizing a neutral gearshift position.

7. The control apparatus of claim 4, wherein said at least one control/regulator unit is configured for controlling a said at least one actuator for a time duration of engagement of a selected gear such that the braking torque of the primary retarder is limited to a maximum allowable braking torque permitted by said selected gear.

8. The control apparatus of claim 7, wherein said at least one control/regulator unit is configured for controlling said at least one actuator in response to said neutral gearshift position such that the braking torque of the primary retarder corresponds to a predetermined, reduced braking torque for a duration of time in which the transmission is in neutral.

9. The control apparatus of claim 8, wherein said at least one actuator includes a control valve.

10. The control apparatus of claim 9, wherein said at least one actuator further includes a by-pass valve.

11. The control apparatus of claim 10, wherein the primary retarder is included in a primary braking system.

12. A method of controlling a primary retarder in a motor vehicle, comprising the steps of:

transmitting a plurality of sensor signals;

receiving said sensor signals; and in response to said receiving step:
recognizing a gearshift position in the vehicle;
activating at least one actuator for controlling a braking torque of the primary retarder; and
controlling said at least one actuator with at least one control/regulator unit such that the braking torque of the primary retarder is one of less than and equal to a maximum allowable braking torque of a gear associated with said sensor signals.

13. The method of claim 12, wherein said sensor signals indicate at least one of:

said gearshift position;

a clutch state;

a fuel delivery state; and an engine speed.

14. The method of claim 13, comprising the further step of calculating said gearshift position with said at least one control/regulator unit using a mathematical algorithm incorporating an engine speed signal, a vehicle speed signal, and a plurality of vehicle-specific parameters.

15. The method of claim 14, wherein said at least one sensor signal includes a sensor signal indicating a neutral gear position.

16. The method of claim 15, wherein the primary retarder is included in a primary braking system.

* * * * *

UNITED STATES PATENT AND TRADEMARK OFFICE
CERTIFICATE OF CORRECTION

PATENT NO. : 6,090,010
DATED : July 18, 2000
INVENTOR(S) : Peter Rose, et al.

It is certified that error appears in the above-identified patent and that said Letters Patent is hereby corrected as shown below:

COLUMN 13

Line 18, delete "ore" and substitute --one-- therefor.

Signed and Sealed this

Seventeenth Day of April, 2001

Attest:

NICHOLAS P. GODICI

Attesting Officer    Acting Director of the United States Patent and Trademark Office